United States Patent
Peixoto et al.

(10) Patent No.: US 10,162,917 B1
(45) Date of Patent: Dec. 25, 2018

(54) METHOD AND SYSTEM FOR IMPLEMENTING SELECTIVE TRANSFORMATION FOR LOW POWER VERIFICATION

(71) Applicant: Cadence Design Systems, Inc., San Jose, CA (US)

(72) Inventors: Fabiano Peixoto, Belo Horizonte (BR); Benjamin Chen, Los Altos, CA (US); Chung-Wah Norris Ip, Cupertino, CA (US); Björn Håkan Hjort, Göteborg (SE)

(73) Assignee: Cadence Design Systems, Inc., San Jose, CA (US)

( * ) Notice: Subject to any disclaimer, the term of this patent is extended or adjusted under 35 U.S.C. 154(b) by 6 days.

(21) Appl. No.: 15/282,936

(22) Filed: Sep. 30, 2016

(51) Int. Cl.
*G06F 17/50* (2006.01)

(52) U.S. Cl.
CPC ........ *G06F 17/504* (2013.01); *G06F 17/5022* (2013.01); *G06F 17/5072* (2013.01); *G06F 17/5081* (2013.01)

(58) Field of Classification Search
CPC .................................................... G06F 17/504
USPC ....................................................... 716/109
See application file for complete search history.

(56) References Cited

U.S. PATENT DOCUMENTS

| | | |
|---|---|---|
| 6,915,248 B1 | 7/2005 | Ip et al. |
| 7,065,726 B1 | 6/2006 | Singhal et al. |
| 7,159,198 B1 | 1/2007 | Ip et al. |
| 7,437,694 B1 | 10/2008 | Loh et al. |
| 7,506,288 B1 | 3/2009 | Ip et al. |
| 7,647,572 B1 | 1/2010 | Ip et al. |
| 7,895,552 B1 | 2/2011 | Singhal et al. |
| 8,205,187 B1 | 6/2012 | Coelho et al. |
| 8,572,527 B1 | 10/2013 | Coelho, Jr. et al. |
| 8,863,049 B1 | 10/2014 | Lundgren et al. |
| 8,984,461 B1 | 3/2015 | Ip et al. |
| 8,990,745 B1 | 3/2015 | Coelho et al. |
| 9,372,949 B1 | 6/2016 | Hanna et al. |
| 9,633,151 B1 | 4/2017 | Sun et al. |
| 9,659,142 B1 | 5/2017 | Coelho, Jr. et al. |
| 9,665,682 B1 | 5/2017 | Guimarães et al. |
| 9,734,278 B1 | 8/2017 | Purri et al. |
| 9,817,930 B1 | 11/2017 | Campos et al. |
| 9,928,328 B1 | 3/2018 | Cohen et al. |
| 2008/0288901 A1* | 11/2008 | Barowski .............. G06F 17/504 716/108 |
| 2009/0089725 A1* | 4/2009 | Khan ............... G01R 31/31721 716/106 |
| 2012/0198408 A1* | 8/2012 | Chopra ................. G06F 17/504 716/127 |
| 2016/0283628 A1 | 9/2016 | Peixoto et al. |

* cited by examiner

*Primary Examiner* — Suresh Memula
(74) *Attorney, Agent, or Firm* — Vista IP Law Group, LLP

(57) ABSTRACT

Disclosed is an improved approach to implement selective transformations of circuit components for performing verification. The approach looks at the observability of components to downstream properties to determine whether transformations are needed. The verification system leverages the knowledge about the behavior of the domains/components to identify only a subset of components that really need to undergo transformation.

21 Claims, 14 Drawing Sheets

METHOD AND SYSTEM FOR IMPLEMENTING SELECTIVE TRANSFORMATION FOR LOW POWER VERIFICATION

BACKGROUND

Many phases of modern electronic design are performed with computer aided design (CAD) tools or electronic design automation (EDA) systems. An EDA system typically receives the high level behavior descriptions of the IC device and translates this high-level design language into netlists of various levels of abstraction using a computer synthesis process. A netlist describes, for example, interconnections of nodes and components on the chip and includes information of circuit primitives such as transistors and diodes, their sizes and interconnections.

After a designer has created an initial set of designs, the circuit designer and/or verification engineers may then test and optimize the design using a set of EDA testing and analysis tools. For example, at the logical level, simulation and formal verification may be used to test the IC design. At the physical implementation level, testing and optimization steps include extraction, verification, and compaction.

To perform simulation or formal verification, the simulation/verification tool must be able to access a model of the system being simulated/verified. A finite state machine (FSM) of the design can be used to create models or automata that is then simulated or formally verified. Circuit simulation uses the mathematical models to replicate the behavior of the circuit design given a set of test stimulus. Formal verification is the act of proving or disproving the correctness of the intended operation of the design, with respect to certain formal specifications or properties of the design.

The issue addressed by the present disclosure is that the process of performing these verification techniques have become more complicated in recent years due to the introduction of low-power designs. With the rapid growth of the wireless and portable electronic markets, there is a constant demand for new technological advancements, which has resulted in more and more functionality being incorporated into battery-operated products, increasing challenges for power management of such devices. Power concerns in server farm and base station are also becoming higher priority. Such challenges include, for example, minimization of leakage power dissipation, designing efficient packaging and cooling systems for power-hungry ICs, or verification of functionality or power shut-off sequences early in the design. These challenges are expected to become even more difficult with the continuous shrinking of process nodes using today's CMOS technology.

To address these low-power challenges, file formats such as UPF ("Unified Power Format") and CPF ("Common Power Format") have been developed that capture power-related design intent information, power-related power constraints, and/or power-related technology information for a circuit design. These files may be accessed and used by EDA tools throughout the EDA implementation flow to design and verify the integrated circuit.

For verification purposes, the information in these files are applied to potentially change the design behavior of components, which in some cases may actually introduce new components into the design during the verification process. For example, consider a module in the design where it is known that under certain conditions, the module will be either powered on or powered off. During either the power-off or power-on states, the verification system needs to understand the impacts of these states upon the operation of the design.

To explain, consider the combinational component (gate 130) and sequential component (134) illustrated in FIG. 1A. For the purposes of formal verification, when power is off to these components, then the outputs of these components may need to be modeled as a free net value.

To model the combinational gate 130 for this purpose in some cases, a transformation can be performed to add a multiplexer 132, where the input of the mux 132 is switched between the normal output of the gate or a free net value ("X"), and the selection of which input line is used for the mux is dependent upon whether the power is on or off (e.g., power off selects the free net and power on selects the original gate output). It is noted that this approach is merely one example of a transformation that may be performed, and one skilled in the art would understand that other types of transformations are also applicable to address this situation.

For the sequential component 134, the transformation for formal verification may create a new version 134' of component 134 to make the register power-aware, e.g., where the synchronous register is converted into an asynchronous register. Here, the new register 134' includes an asynchronous value input ("X") and a control input for power that switches the register between the normal register value and the asynchronous value, depending upon whether the power is either on or off.

With conventional verification systems, all such components in a design would undergo some form of transformation to implement the formal verification process. The problem is that in large modern designs, there may be many millions or more of these components in the design. The transformation of all of these components consumes an inordinate amount of computing resources, and may create lengthy and very expensive delays for the design process.

Therefore, there is a need for an improved approach to implement transformations for verification of electronic circuit designs.

SUMMARY

Some embodiments of the present invention address the above problems by implementing selective transformation of components when verifying designs for low power verifications. The effect of an artifact can be observed, together with its conditions in which it could be observed, when performing transformations. In this way, the verification system leverages the knowledge about the behavior of the domains/components to identify only a subset of components that really need to undergo transformation. This approach therefore provides a much more efficient approach to implement verification for power-aware designs.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1A:
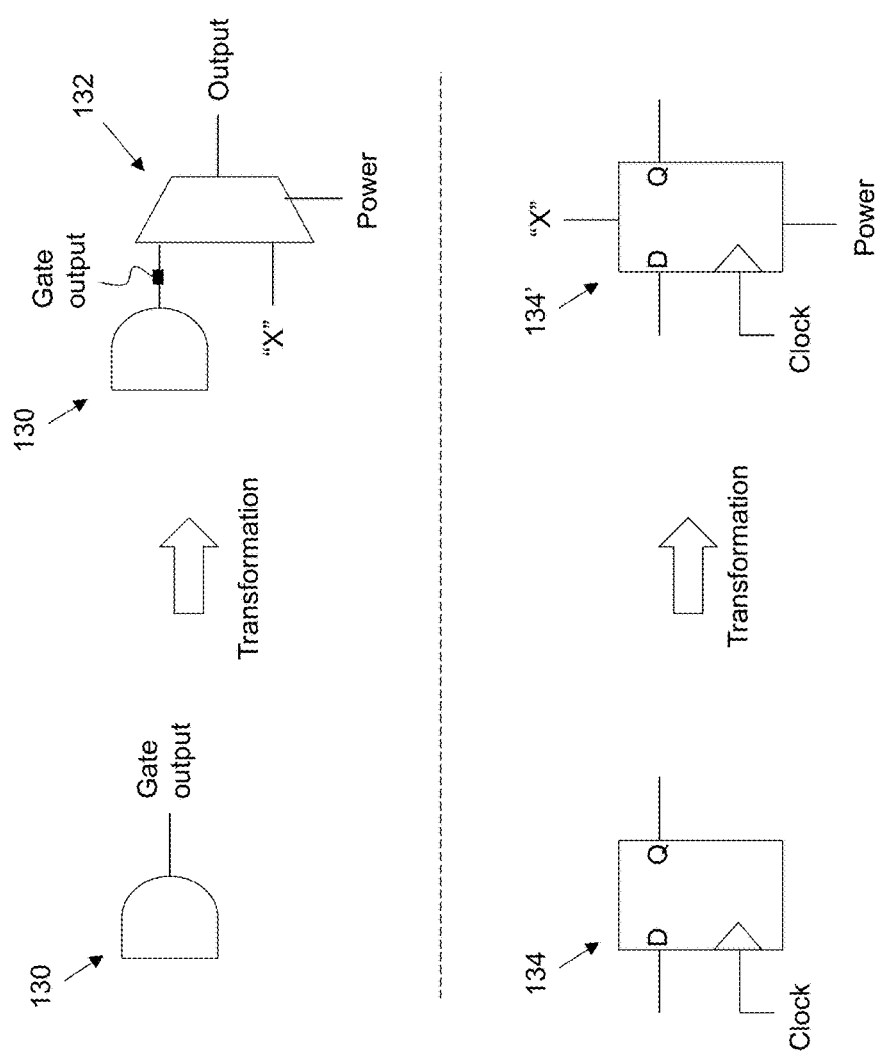
FIG. 1A illustrates example transformations.
Figure 1B:
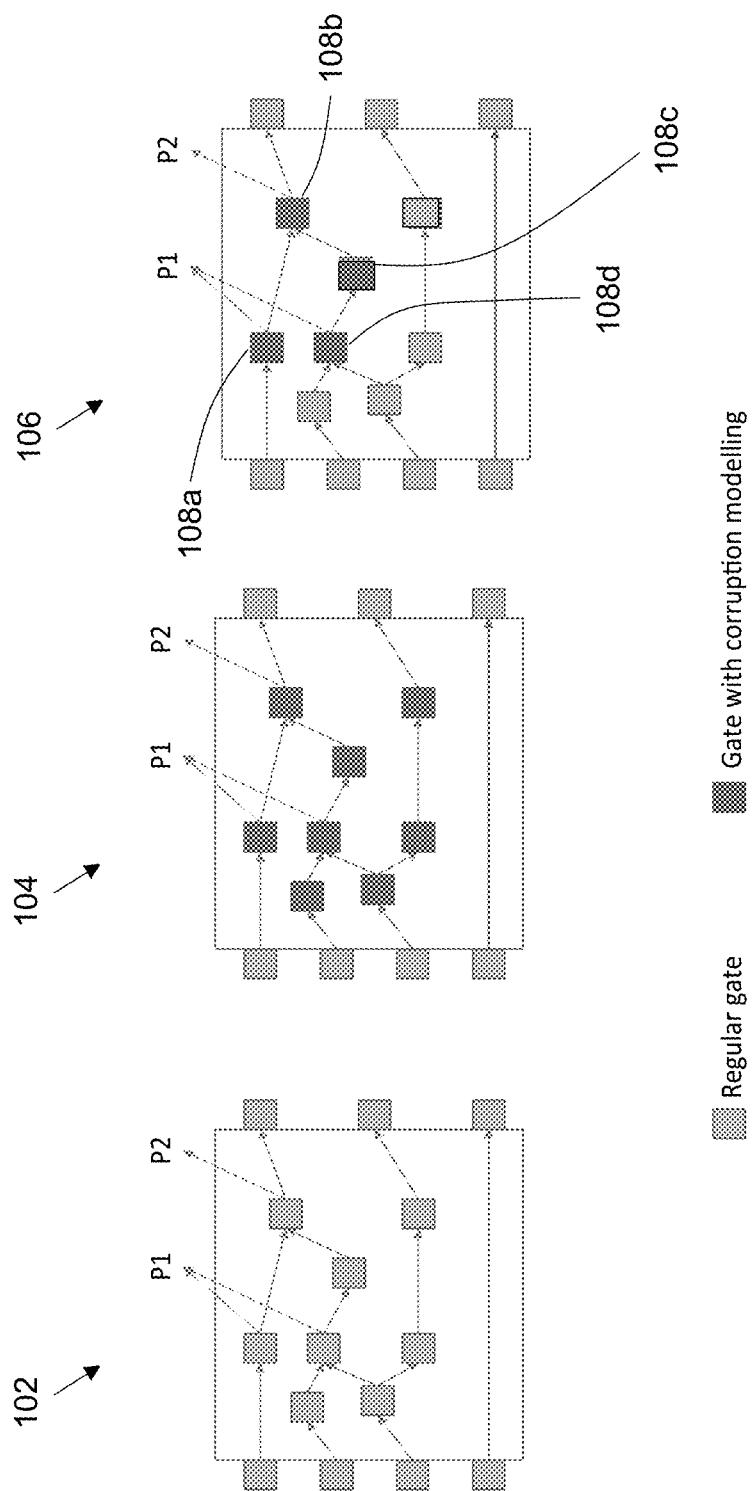
FIG. 1B contrasts selective transformations from an approach to transform all components.

Embodiments of the invention provide an improved method, system, and computer program product to implement selective transformation of components when verifying electronic designs. FIG. 1B illustrates an original design at 102 having a set of components. Assume that this design corresponds to two properties P1 and P2 that need to be addressed by the formal verification process with respect to certain power intent specifications for the design. As shown at 104, with conventional approaches, an 'all-you-can-eat" technique is applied to transform each and every component in the design to perform the verification, where the list of components to transform is built considering the full modelling of the power intent. This means that a huge number of verification artifacts will be artificially inserted in the power aware design model for a typical large modern design.

One key aspect of some embodiments of the invention is to consider when the effect of an artifact can be observed, together with its conditions in which it could be observed. This enables simplification of the transformation. In the extreme case where the effect of the artifact cannot be observed at all, no transformation would be needed and that artifact would not even be included in the power aware design model. Therefore, as shown at 106, embodiments of the invention will analyze the properties P1 and P2 to make a determination of which of the components would actually be observable if a corruption occurs at a given stage for a given property, and will then only transform the observable components (e.g., components 108a-d). In this way, the verification system leverages the knowledge about the behavior of the domains/components to identify only a subset of components that really need to undergo transformation. This approach therefore provides a much more efficient approach to implement verification for power-aware designs.

As discussed in more detail below, the selective transformations are applied to components that potentially correspond to "corruption" for the verification process. However, in some embodiments, certain components that do not correspond to such corruption transformations would always undergo transformation.

Figure 2A:
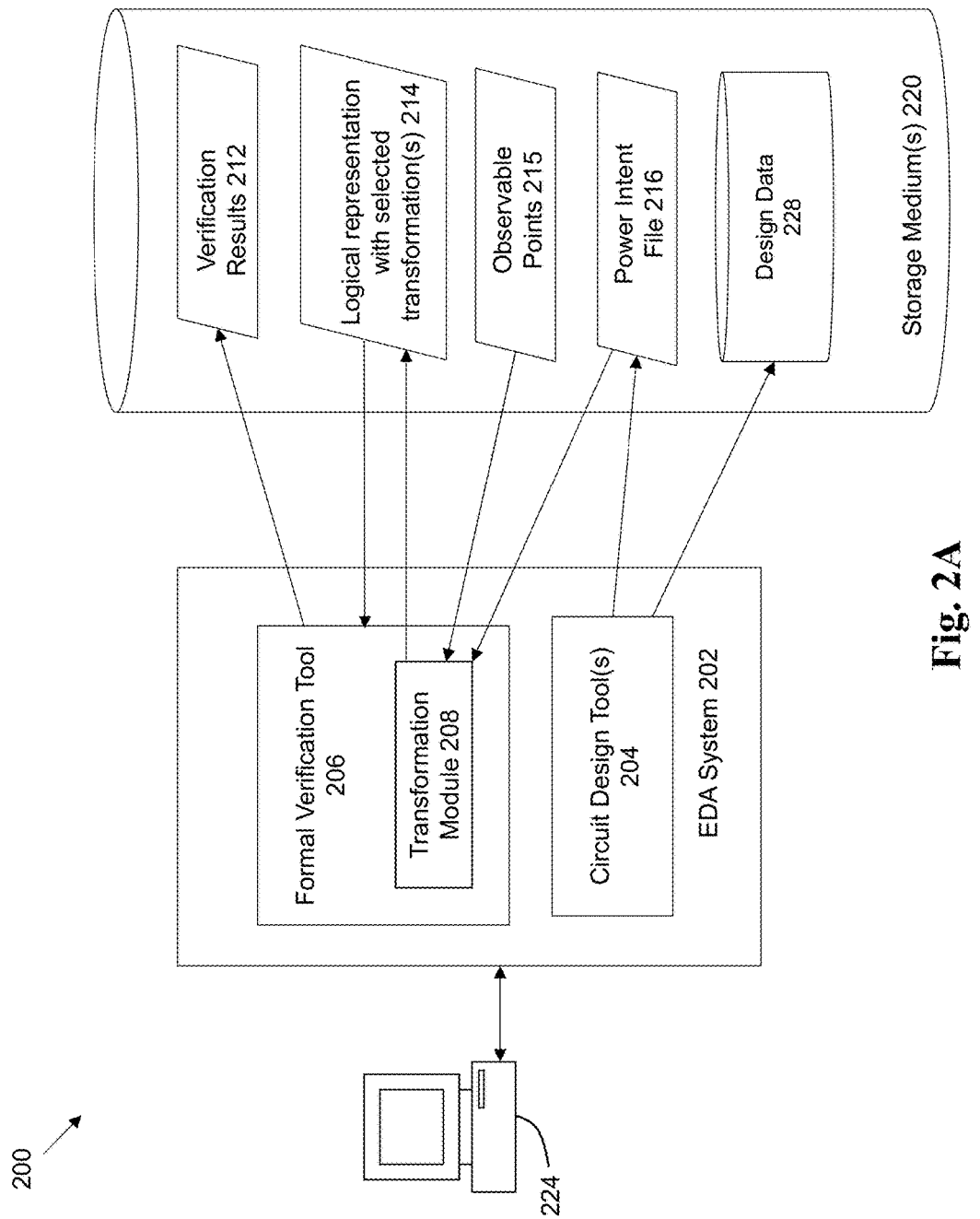
FIG. 2A illustrates an example system which may be employed in some embodiments of the invention to implement selective transformation for verification of an electronic design.

FIG. 2A illustrates an example system 200 which may be employed in some embodiments of the invention to implement selective transformation for verification of an electronic design. System 200 may include one or more users on user station 224 that interface with and operate a computing system 202 to control and/or interact with system 200. Such users include, for example, design engineers or verification engineers. The computing system for the user station and/or EDA computing system comprises any type of computing device that may be used to operate, interface with, or implement one or more EDA applications. Examples of such computing systems include for example, servers, workstations, personal computers, or remote computing terminals connected to a networked or cloud-based computing platform. The computing system may comprise one or more input devices for the user to provide operational control over the activities of the system 200, such as a mouse or keyboard to manipulate a pointing object. The computing system may also be associated with a display device, such as a display monitor, for displaying electronic design analysis results to users of the computing system.

Any data used, generated, or stored within the system 200, such as electronic design data 228, power intent file 216, and/or verification results 212 may be stored in a computer readable storage medium 220. The computer readable storage medium 220 includes any combination of hardware and/or software that allows for ready access to the data that is located at the computer readable storage medium 220. For example, computer readable storage medium 220 could be implemented as computer memory and/or hard drive storage operatively managed by an operating system, and/or remote storage in a networked storage device, such as networked attached storage (NAS), storage area network (SAN), or cloud storage. The computer readable storage medium 220 could also be implemented as an electronic database system having storage on persistent and/or non-persistent storage.

One or more EDA tools at system 202 are operable by a user in system 200 to design and/or perform verification of the electronic circuit design. The circuit design tool 204 is used by the designer to generate the design data 228 for the electronic design. For example, the circuit design tool 204 may be used to generate a register-transfer-level (RTL)

model of the electronic design. The user may also create one or more power intent files 216, e.g., in either the UPF or CPF formats.

The system 200 may also include a formal verification tool 206 to perform formal verification on the electronic circuit design, where the formal verification tool 206 operates by providing a formal proof for the circuit design using the logical circuit representation 214.

A transformation module 208 is employed to generate a logical representation 214 of the electronic design. While the transformation module 208 is illustrated in the figure as being within the formal verification tool 206, it is noted that the inventive concepts described herein is not reliant upon the transformation module 208 being a part of the formal verification tool 206. Indeed, the transformation module 208 may be implemented separate from the formal verification tool 206 and used for other types of processing/verification within an EDA system.

As previously noted, low power verification at early stage of the design process involves taking a register-transfer-level model (RTL) of a design and inserting low power artifacts, as specified from a power intent format such as UPF or CPF.

Conventional tools insert such low power artifacts at every applicable location to fully capture the low power behavior of the design. For example, when a power domain is powered off: (1) All non-retained sequential elements are corrupted; (2) For each output port on a power domain boundary, a corruption mux is inserted on the first combinational driver that does not have a sequential element or corruption mux in its transitive fan-in within the power domain; and (3) For each input port on a power domain boundary, a corruption mux is inserted on the output of the first driver that drives a signal inside the domain.

These transformations cause the resulting design model to be significantly more complex and may create significant overhead for the performance of the verification tool/process. This could be especially difficult for formal verification, due to reasons such as (a) scalability, where exhaustive verification is highly sensitive to increase in design size, and (b) X-modeling, where corruption is usually modeled as X, and X-source has adverse effect in formal analysis.

To address these issues, the transformation module 208 is employed to generate a logical representation 214 of the electronic design, where only certain of the components within the design are selected for transformation.

A list 215 of observable points is considered in determining the simplification that can be performed. Observable points may correspond to, for example, properties, primary output signals, etc., and may depend on the type of verification task being executed. Further detailed examples of observable points according to some embodiments are provided below.

It is noted that in the current embodiment, the selective transformations of the current invention are applied only to specifically-identified corruption-related components. In some embodiments, certain components that do not correspond to corruption transformations would always undergo transformation. For example, transformation due to isolation items from the CPF/UPF files are always transformed, and would not be subject to the selective transformations.

Figure 2B:
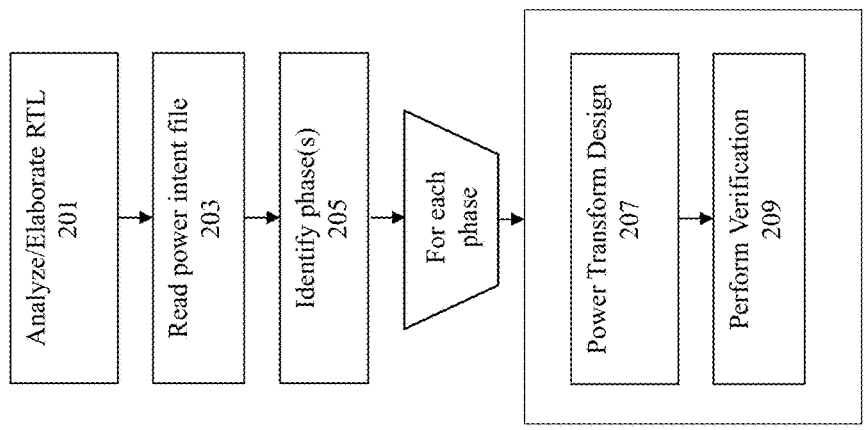
FIG. 2B shows a flowchart of a process for implementing selective transformation for verification according to some embodiments of the invention.

FIG. 2B shows a flowchart of a process for implementing selective transformation for verification according to some embodiments of the invention. At 201, the process analyzes and elaborates the RTL for the design. This step reads in the user's design, and generates a logical representation of that design. This is performed by creating a syntactical representation of the design, e.g., as a syntax tree. The elaboration process is used to generate a logic representation of the design.

At 203, the UPF/CPF file is received for the design. UPF/CPF file include, for example, power-related design intent information, power-related power constraints, and/or power-related technology information for a circuit design.

It is noted that power sequence information is also accessed at this point. The power sequence information may be provided as part of a power control module (PCM) within the RTL, or a default PS (power sequence) from within the EDA tool if the PCM is not provided within the RTL.

At this point, at 205, the power sequence is partitioned into a plurality of different phases. An example approach for partitioning a power sequence into a plurality of phases is described in more detail below. For each of the phases, the process takes the logical representation and the power-information from the UPC/CPF file, and at 207, implement power transformation for components in the design. Thereafter, at 209, formal verification can be performed upon the transformed design.

This approach therefore considers if the effect of an artifact can be observed, together with its conditions in which it could be observed. This enables simplification of the transformation, where if the effect of the artifact cannot be observed at all, then no transformation would be needed and that artifact would not even be included in the power aware design model.

As previously discussed, a list of observable points is considered in determining the simplification that can be performed. These observable points depend on the type of verification task being executed, e.g.: (a) a property referring to signals inside a block that is always powered on; (b) a property referring to signals inside a power domain that has been powered on after previously being powered off; (c) a property referring to outputs at a power domain boundary during the power on or power off sequence; and/or (d) a property referring to elements from the power artifacts, such as retained values of retention flop.

Another aspect of some embodiments is that the observable points can be related to the different phases of the power management sequences. An example power sequence may include some or all of the following: (1) de-assert power on signal; (2) save retention state; (3) start driving isolation value; (4) disconnect power to off; (5) connect power back to on; (6) restore retention state; (7) remove isolation value; and/or (8) assert power on signal Leveraging the different phases of the power management sequences, the low power verification problem can be partitioned into tasks, such as but not limited to, the following: (1) the correctness of a powered-off power domain during the time it is powered off; (2) the correctness of a powered-off power domain during the time it being power on; (3) the correctness of a powered-on power domain while some power domains are powered off; (4) the correctness of a powered-on power domain while some power domains are being powered on; (5) the correctness of a power domain being powered on while some power domains are powered off; and/or (6) the correctness of a power domain being powered on while some power domains are being powered on in parallel Once the verification process is partitioned into these tasks, some embodiments of the invention determines a subset of locations relevant to each of the tasks and from that point on defines the list of transformations necessary and sufficient for the verification task.

For the task pertaining to correctness of a powered-off power domain during the time it is powered off, this focuses on the behavior of the outputs of the powered-off domain, since the design behavior should not depend on the internal nets of a powered-off domain. Based on observability analysis, only a thin layer of logic driving the outputs would need to be corrupted.

With respect to correctness of a powered-off power domain during the time it being power on, this also focus on the behavior of the outputs of the powered-off domain, but in this case, the behavior needs to be analyzed together with the power-off and power-on sequences, taking in to factor of when the retention values are saved and when they are restored, etc. The observability analysis will result in a different transformation, and yet it would be localized and would not require transformation of the whole design.

With respect to correctness of a powered-on power domain while some power domains are powered off, this focuses on the behavior of a powered-on domain when receiving values from the outputs of a powered-off domain. The verification results for the task pertaining to correctness of a powered-off power domain could be applied to the relevant outputs of the powered-off domain, plus reducing the need to actually perform power-specific transformation in the powered-off domain. The behavior that depends on remaining outputs of the powered-off domain would require some transformation in the powered-off domain, and the same technique for the task pertaining to correctness of a powered-off power domain can be used to determine the exact transformation required in this task.

The other tasks are performed similar to what was described above for correctness of a powered-off power domain during the time it is powered off, but also adding the effect of power-off and power-on sequences. The consideration of such sequences allows corrupted data to appear at the inputs of the specific domain being verified, albeit temporarily. The observability analysis leads to transformation of the necessary logic in the neighboring power domain. For the task pertaining to correctness of a power domain being powered on while some power domains are being powered on in parallel, this would be addressed by looking at the global power-off/power-on sequences, not just for one specific power domain, but for how multiple power domains are powered on with relative timing and potential overlaps.

As previously noted, the invention leverages the use of observability analysis. To explain, consider an example with a simple AND-gate:

$A = \text{and}(L, R)$ where all of A, L and R are in the same power-domain. Here, let P1 represent the 'should corrupt' predicate and C1, C2 . . . Cn corruption symbols.

$A' = P1?C1:\text{and}(L', R')$ $L' = P1?C2:\text{driver-of-}L$ $R' = P1?C3:\text{driver-of-}R$ where driver-of-L/R is the transformed versions of what is backing L/R, external inputs, gates from the same or another power-domain.

Here, one would want to know if C1, C2 Cn can "taint" or affect A'. The answer for C2 and C3 will be "NO", as the only way for C2 to affect L' (respectively C3 to affect R') would be for P1 to be true, but if P1 is true then only C1 affects A', i.e. L' is not passing its value to A' (respectively for the value of R' to A').

Here, it may be less expensive to apply the constrain P1==true and perform a walk of the fan-in of A' under the consequences of that:

$A' = \text{true}?C1:\text{and}(L', R')$ $L' = \text{true}?C2:\text{driver-of-}L$ $R' = \text{true}?C3:\text{driver-of-}R$ According to semantics of the if-then-else statement and multiplexer, this is equivalent to:

$A' = C1$ $L' = C2$ $R' = C3$ where it can be trivially be seen that neither C2 nor C3 are needed from A'.

The analysis becomes more complex when state-holding elements are involved and a sequential analysis would be used. One embodiment of the invention may leverage X-propagation analysis, using X as the tainted data resulting from data corruption during power off. Another embodiment may use security analysis, regarding the tainted data as sensitive data that should not be passed down to an observable point. It is noted that combinations of power domains, power sequences, reset, clock definitions, etc. make finding the relevant corruption points much less trivial. In addition, the more information one would have about the relation of different P1, P2 . . . values (where there are multiple power domains) could help reduce the number of observable corruption candidates. Such relation among P1, P2, etc. is usually reflected in the global power sequence, combining the local power sequences, one from each power domains.

The analysis could include processing of 'when' the outputs are observed—for instance a retention DFF would output X when power is off for the external domain but will restore its non-corrupt value before being observed externally.

Figure 3:
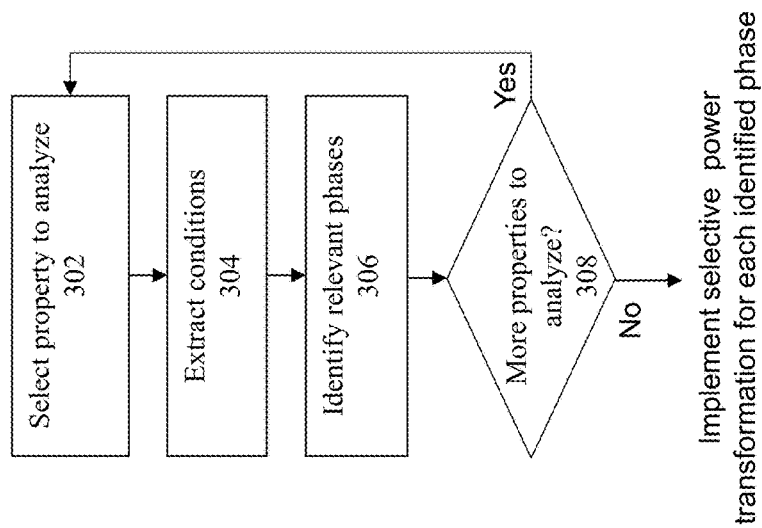
FIG. 3 shows a more detailed flowchart of an approach to implement some aspects of the invention pertaining to identification of the phases.

FIG. 3 shows a more detailed flowchart of an approach to implement some aspects of the invention pertaining to identification of the phases. At 302, the process selects one of the properties to analyze. In some embodiments, the property corresponds to observable points for a given verification task based upon the design components and the power information, e.g., expressed as follows: "Condition-→Expression".

This property means that the "Expression" must be satisfied if the "Condition" is true. The condition pertains, for example, to the state of a value within the design, such as whether a value is marked as "ON" or "OFF". The expression pertains to some aspect of the property to be proved. As previously noted, examples pertaining to properties may include the following: (a) a property referring to signals inside a block that is always powered on; (b) a property referring to signals inside a power domain that has been powered on after previously being powered off; (c) a property referring to outputs at a power domain boundary during the power on or power off sequence; and/or (d) a property referring to elements from the power artifacts, such as retained values of retention flop.

At 304, for the property currently being processed, the conditions for that property are then extracted, and at 306, the relevant phases are then identified. An example power sequence may include the following: (1) de-assert power on signal; (2) save retention state; (3) start driving isolation value; (4) disconnect power off; (5) connect power on; (6)

restore retention state; (7) remove isolation value; and (8) assert power on signal. Conditions for these may pertain, for example, to whether the particular signals for any of these steps in the sequence (such as "power on") are high or low. The phases would pertain to the portions of the sequence that are conditioned upon these signals.

At 308, a determination is made whether there are any further properties to analyze. If so, then the process returns back to 302 to select the next property to analyze. If not, then the process proceeds to perform power transformations for each of the identified phases.

Figure 4:
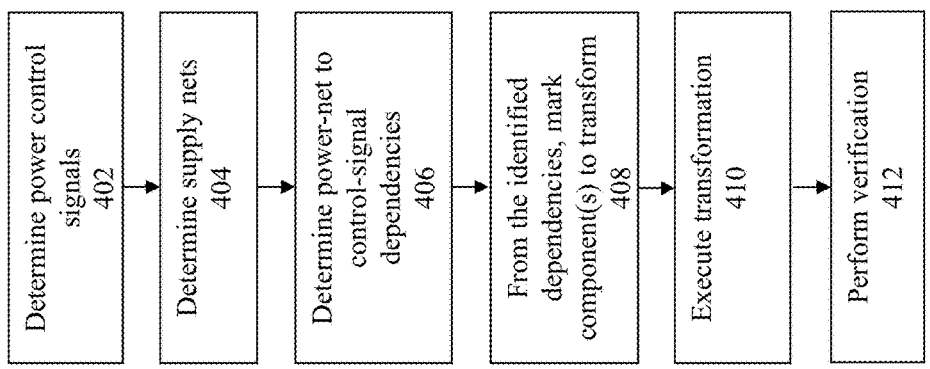
FIG. 4 shows a more detailed flowchart of an approach to implement selective transformations according to some embodiments of the invention.

FIG. 4 shows a more detailed flowchart of an approach to implement selective transformations according to some embodiments of the invention. This process is performed on the basis of each of the properties to be verified in the design. Therefore, this process generates a list of components to be marked for transformations for the property under examination.

At 402, the power control signals are identified. This action is performed by reviewing the RTL and UPF to determine the power control signals. At 404, the supply nets are identified, e.g., by identifying the VDDs for each of the modules to be analyzed.

At 406, the power-net to control-signal dependencies are identified. This step is premised upon the idea that any corruption that need to be addressed for verification really relates to its observability. For example, when everything is powered on in a module or a set of inter-related modules, then there is likely no corruption so there is nothing to prove. However, when certain components have been powered off, then there may be downstream properties that are affected by possible corruptions, subject to control signals that may have or have not been applied to certain components (such as isolation cells). Since there may be a chain of components that extend to the downstream properties, it may be the case that only certain of these components will be able to realistically affect the downstream within a certain phase. Therefore, the specific dependencies are identified to determine exactly which of the components will really affect the analysis of the downstream property.

This action may be considered with regards to logical dependencies, phase dependencies, or X-propagation. Logical dependency pertains to whether there is a physical impact on the downstream property based upon the operation of a given component (e.g., whether the component outputs a signal that extends through a chain of components to affect the property). Therefore, the physical location/impact of the components are considered for logical dependencies. Phase dependency pertains to whether the dependency exists when considered in light of a specific phase of the power sequence, e.g., where dependences only exists when certain components are turned off or on during particular portions of the power sequence. For example, certain properties may not need to be enforced when power is turned off (e.g., a property for a given module may not need to be enforced when power is off to that module, and therefore different phases for this module may have upstream corruption dependencies that differ depending upon whether power is on to that module). In general, especially when phase dependencies cannot be identified, one can apply x-propagation analysis to determine whether an X produced by a corrupted register can be propagated to the downstream property. For instance, a power domain may be restored by a reset sequence before isolation is disabled. The sequence may involve many clock cycles so a simple phase analysis may be insufficient.

At 408, for the identified dependencies, the components that pertain to the dependency is marked for transformation on a transformation list for the target property. This means that if there are multiple components within a chain of components leading to a given property, and corruption of only one of the components is observable downstream for the property, then only that component needs to be marked for a transformation for that property.

At 410, the transformation(s) are executed for the identified components. For example, as previously illustrated in FIG. 1A, a register may be transformed into a revised register having a new asynchronous input and switch coupled to power to switch between the asynchronous input and the original input. Once the marked transformations have been executed, then at 412, the verification is performed upon the transformed logical representation of the circuit design.

Figure 5A:
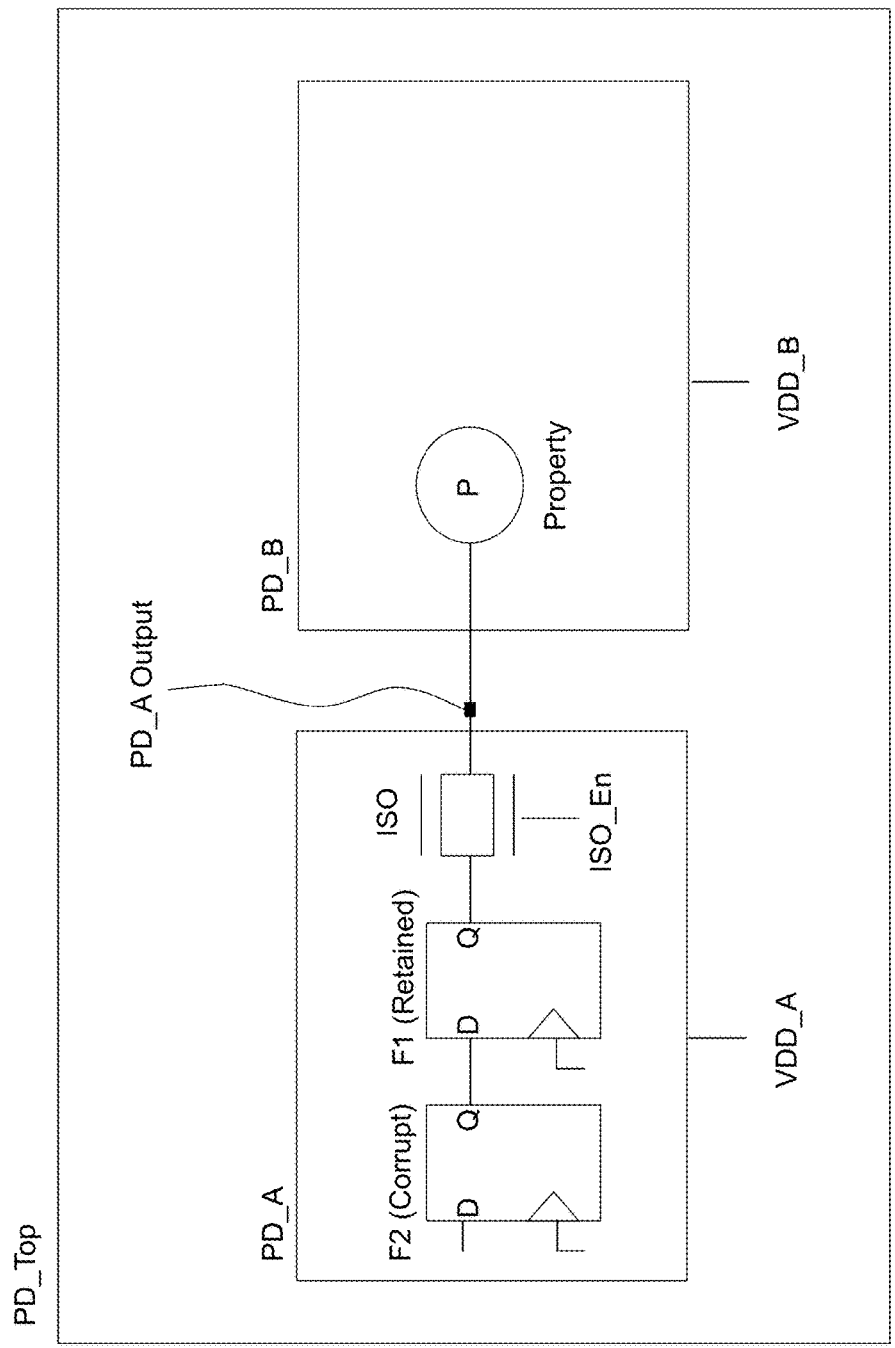
FIGS. 5A-G provide an illustrated example of an embodiment of the invention.

FIGS. 5A-G provide an illustrated example of an embodiment of the invention. FIG. 5A shows an example design having modules PD_A (within a first power domain) and PD_B (within a second power domain), where both PD_A and PD_B are within a top module PD_Top. Since PD_A and PD_B are within different power domains, this means that they can be separately powered on and off. Module PD_A is supplied with power by VDD_A and module PD_B is supplied with power by VDD_B.

In this example, a property P exists within PD_B that needs to be proved during the formal verification process. The input to P is the output from PD_A. It is assumed that P is only relevant when VDD_B is on and is not relevant when VDD_B is off.

Within PD_A, a register F2 has an output that is coupled to another register F1. The output of F1 is coupled to an isolation cell ISO. During the normal power on state for PD_A (when VDD_A is on), the output of the ISO cell is the pass-though value from F1. However, when power is off to PD_A, then the ISO cell drives its output to a fixed value. In normal operations, this permits the output from PD_A to be clamped to a known value during power off states. As such, it is very important to assert the ISO enable signal (ISO_En) to turn on the ISO cell before power is turned off to PD_A. Failure to do so could mean that possibly corrupt values may be output from PD_A to PD_B. It is noted that F1 and F2 may or may not be retention components. For example, F1 may be a component such as a retention flop or retention register having a retained value, while F2 may be a non-retention component corresponding to a corrupt value.

Figure 5B:
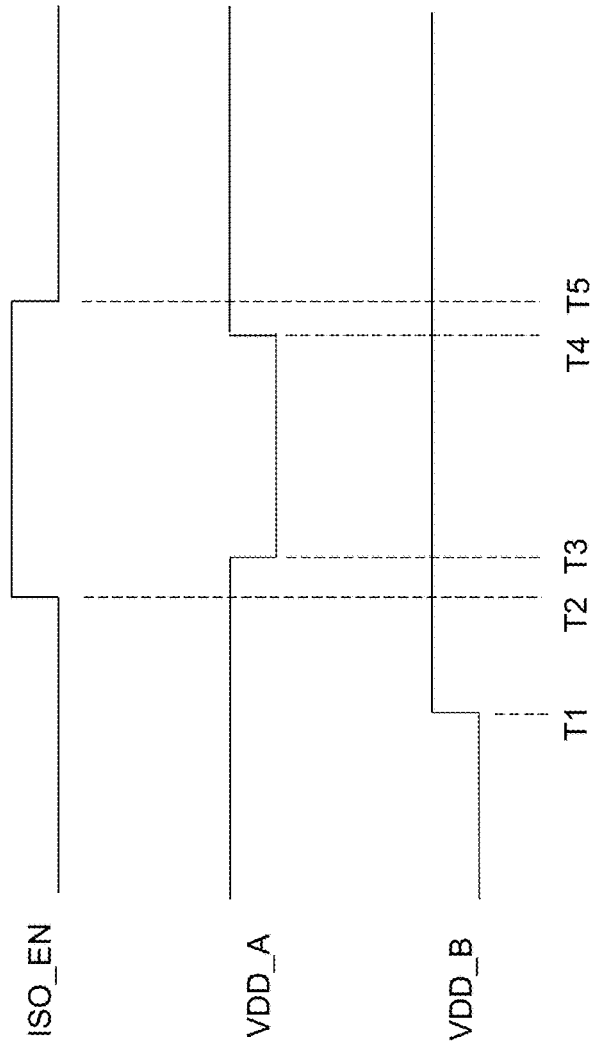

FIG. 5B illustrates some example signal inputs to the circuit design. Assume that at time T1, VDD_B is turned on and stays on. However, VDD_A turns off at T3 and does not turn on again until T4. Just prior to turning off VDD_A, the ISO_En signal is turned on at T2. Similarly, Just after VDD_A is turned back on, the ISO_En signal is turned off at T5.

When the circuit components of FIG. 5A are viewed in light of the signals shown in FIG. 5B, it can be seen that the input to property P (which is the output of PD_A) is highly dependent upon whether VDD_A is on or off, and whether ISO_En has been turned on to enable the ISO cell.

Therefore, formal verification can be used to check for whether a possible problem exists for these components relative to property P, to determine if there are possible issues that need to be analyzed relative to different ON or OFF states between PD_A and PD_B, along with various components within these modules during the power sequence for the circuit design. The question is whether any of the components need to be transformed to perform the formal verification.

Figure 5C:
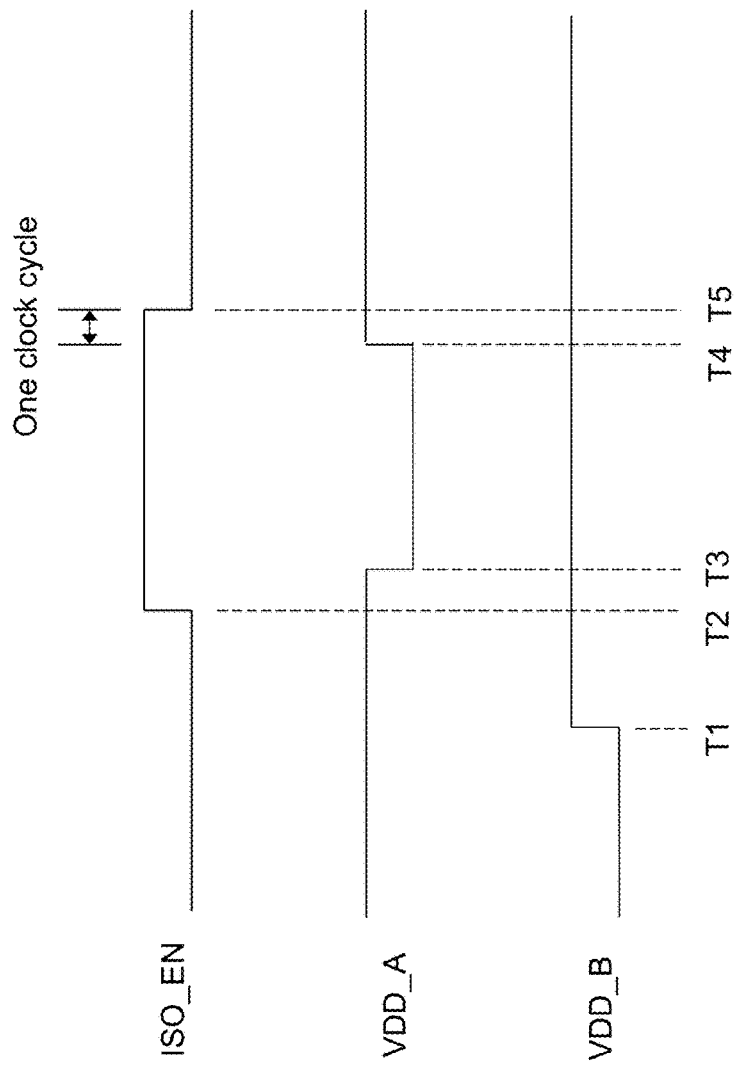

As previously noted, the analysis of whether any transformation need to be performed is based at least in part upon the observability of a given component, in light of the power nets and the various control signals. Here, the question is whether corruption from either (or both) of F1 and/or F2 would be observable for property P for the different permutations of the waveforms shown in the figures. To illustrate the analysis by way of example, assume that as shown in FIG. 5C, a single clock cycle exists between T4 and T5. Also, it is assumed that the values of F1 and F2 are saved during power off and restored instantaneously during power on.

Figure 5D:
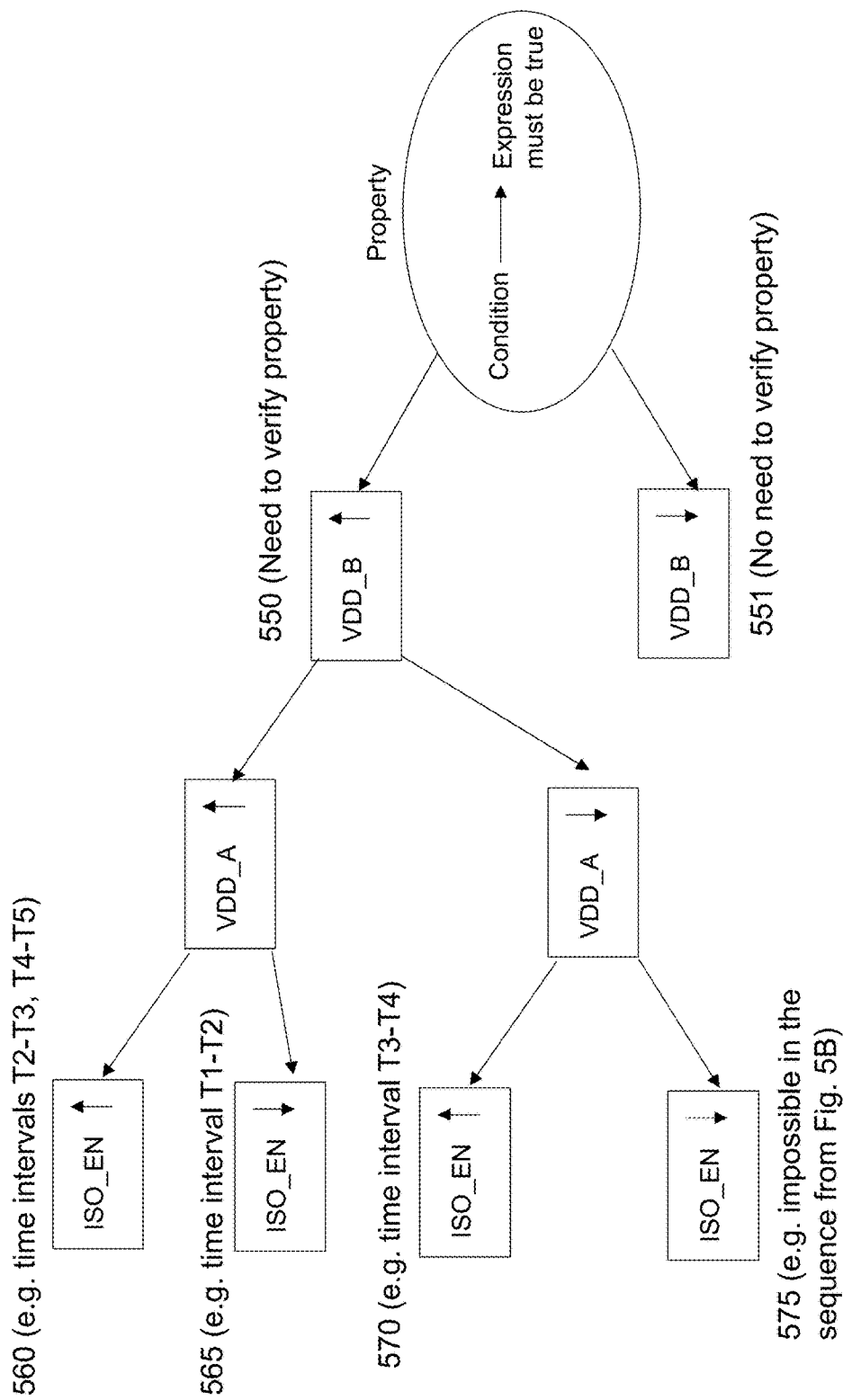

FIG. 5D shows a diagram that maps out some of the possible states/stages in the power sequence for the example components/signals. Here, a first order of dependency for property P is related to whether or not VDD_B is on or off. It is assumed for purposes of illustration that P is only relevant when VDD_B is on, hence the path with 551 does not need to be verified.

Next, the chain of dependencies is analyzed relative to whether VDD_A is on or off. The path with 575 is impossible with respect to the power sequence in FIG. 5B, so it does not need to be analyzed. The path with 570 corresponds to the time interval between T3 and T4, where the isolation is driving the output of power domain PD_A; as a result, no transformation for F1 and F2 are needed during this phase. The path with 565 corresponds to the time interval between T1 and T2; power domain PD_A has never been turned off, so there is no need to transform F1 and F2 for analysis in this phase as well. However, the path with 560 needs to be analyzed carefully. This path corresponds to two time intervals, T2 to T3 and T4 to T5. For the time interval T4 to T5, when VDD_A is being turned on while ISO_EN is being turned off, then there is a possibility of a corrupt signal from somewhere upstream in PD_A being passed to property P. To determine exactly which upstream components may be observable as supplying a corrupt signal value, the next stage of dependencies is analyzed relative to whether the ISO_En signal is turned on or off when VDD_A is being turned on.

In this situation, there may be a possible effect from the output of F1 upon the values passed from the ISO cell to property P. This is because the output of F1 is directly coupled to the ISO cell, and hence any corruption in the output of F1 could create a problem if passed through the ISO cell to the property P. Therefore, corruption from F1 may be observable for property P. As such, for purposes of formal verification, F1 should be marked for transformation.

However, the process needs to also determine whether any corruption from F2 would be observable for property P. If observable, then F2 would also need to be marked for transformation. If not observable, then there would not be any need to transform F2, and hence the verification process can achieve some measure of computational savings that will positively affect the efficiency and performance of the verification process.

Figure 5E:
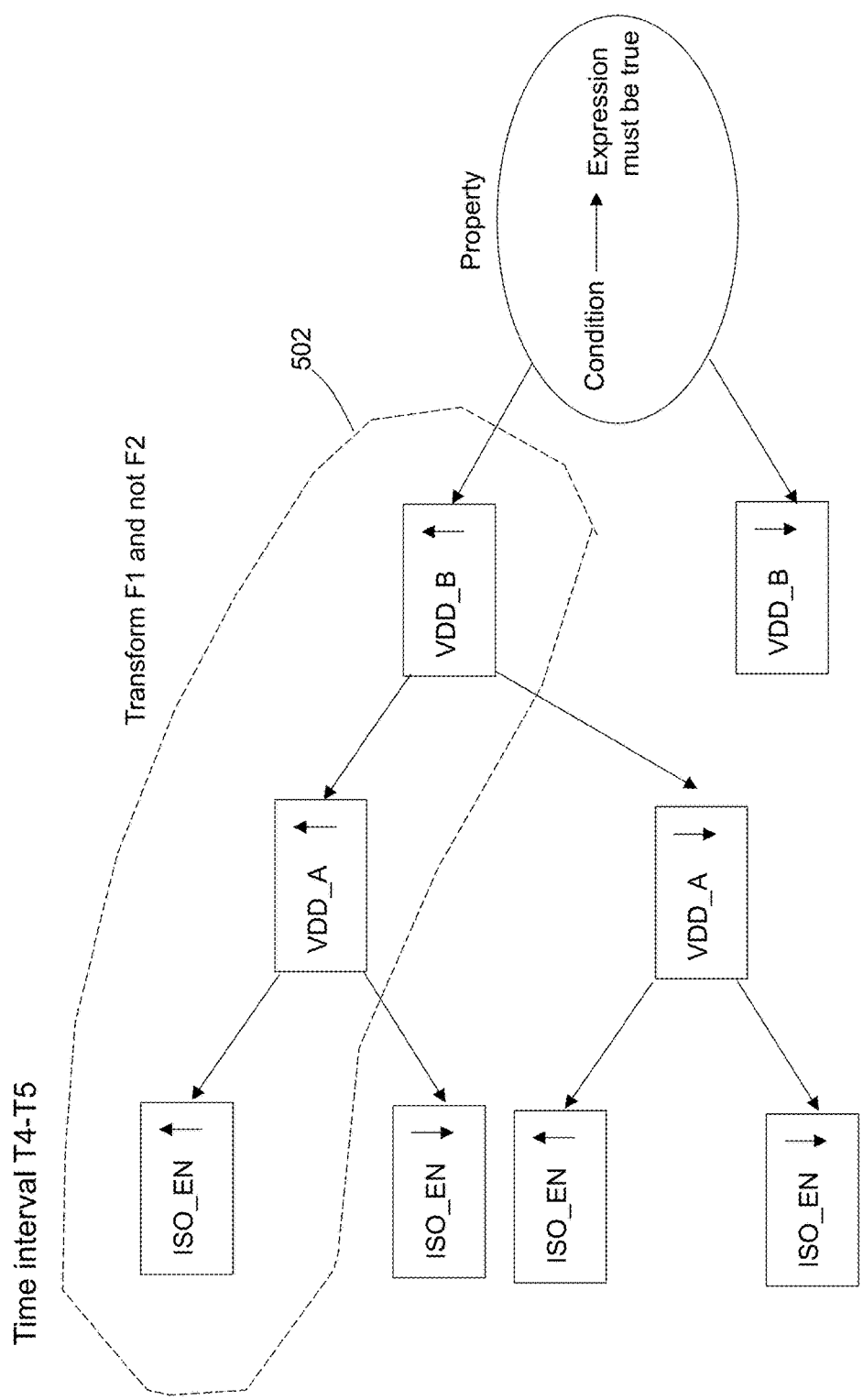

As previously noted from FIG. 5C, it is assumed that only a single clock cycle exists between T4 and T5 (from turning on VDD_A to turning off of ISO_En). In this situation, given the single cycle between power on for VDD_A and the ISO cell being turned off, there is no possibility of that a corrupt value from F2 will be able to propagate through F1 to negatively affect property P (which would need more than one clock cycle). The corrupted value at F2 from 2 cycles or more ago would not be received by F1, since F1 is corrupted. The corrupted value at F2 from 1 cycle ago would not corrupt F1, since the retained value for F1 is restored to F1 right before isolation is turned off. Therefore, as illustrated in FIG. 5E, the dependency path 502 through the diagram would only require F1 to be marked and not F2, since any corruption from F2 would not be observable for property P.

Figure 5F:
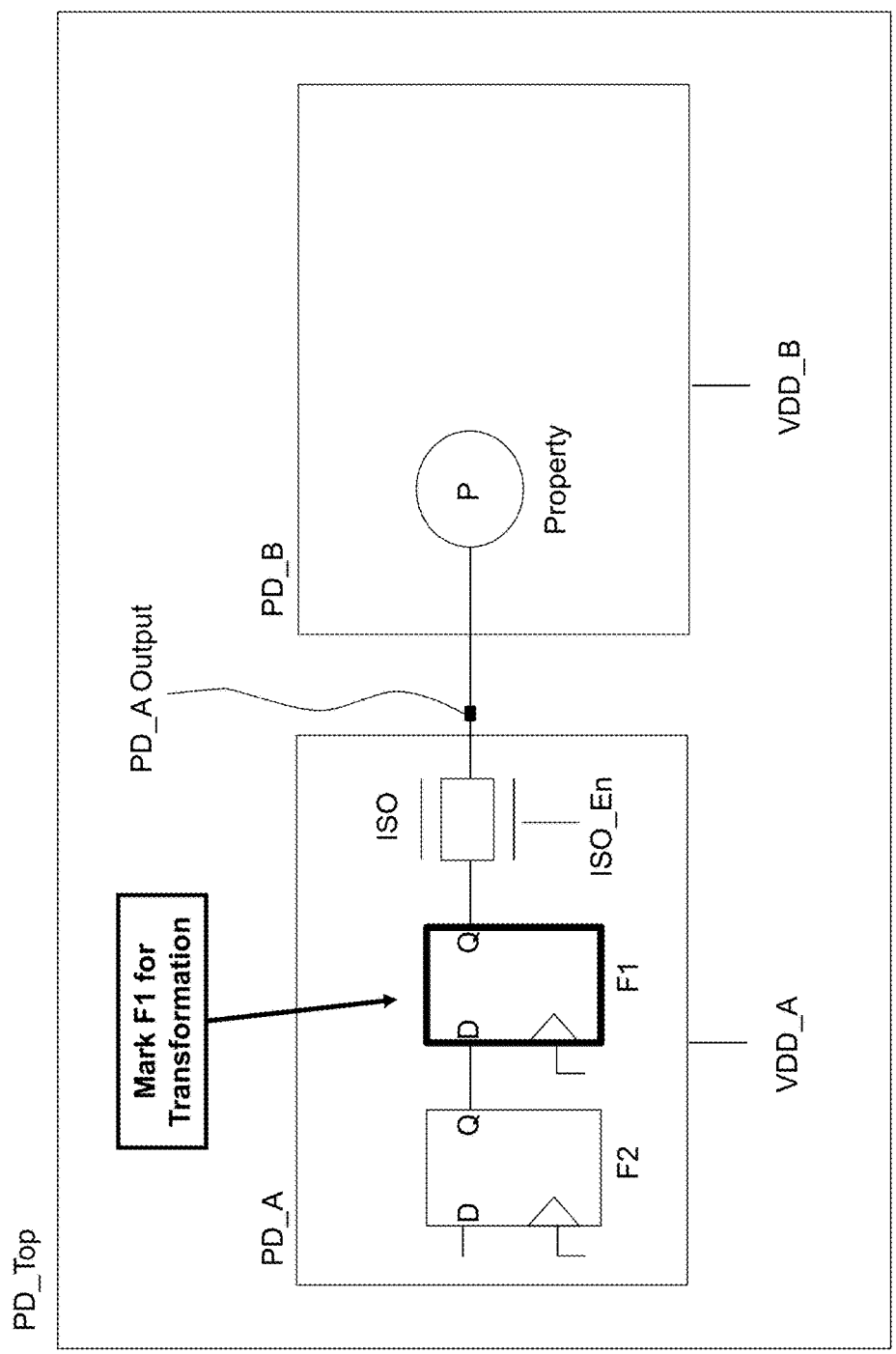

FIG. 5F shows an illustration of the logical representation of the design, indicating which of the components are marked for transformation. Here, register F1 is marked for transformation, while F2 is not marked for transformation. As stated above, pertaining to the time that ISO is about to be switched off to the time the ISO is switched off (transient period), the corruption in the upstream devices may affect the proof of the downstream property. However, if this transient period is one clock cycle, then F2 (upstream of F1) only propagates to F1 but not the downstream property P. Therefore, no corruption is needed for F2 while corruption is needed for F1 because F1 will propagate to the downstream property P during this one cycle transient period.

Figure 5G:
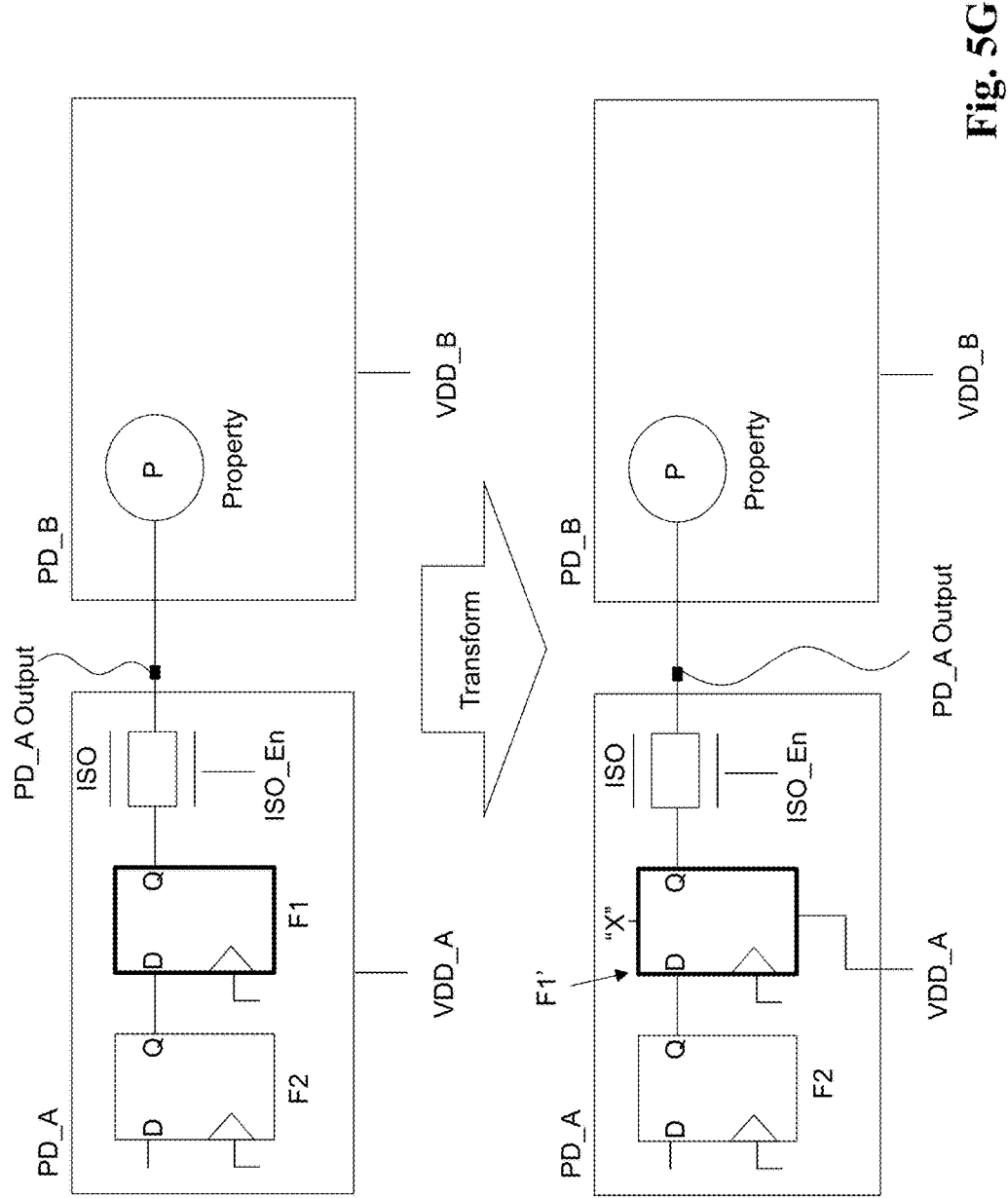

FIG. 5G illustrates the results of performing selective transformation for the example design, where only F1 has been transformed (from F1 into a revised F1'), and F2 has not be transformed. Here, the example transformation create a new version of the register F1' that includes an asynchronous value input ("X") and a control input that switches the register between the "D" value and the asynchronous value, depending upon whether the power is either on or off.

Therefore, what has been described is an improved approach to implement selective transformations of circuit components for performing verification. The inventive approach looks at the observability of components to downstream properties to determine whether transformations are needed. This greatly allows for simplification of the transformation with reduced amounts of components that must be transformed to achieve accurate verification results. In this way, the verification system leverages the knowledge about the behavior of the domains/components to identify only a subset of components that really need to undergo transformation. This approach therefore provides a much more efficient approach to implement verification for power-aware designs.

System Architecture Overview

Figure 6:
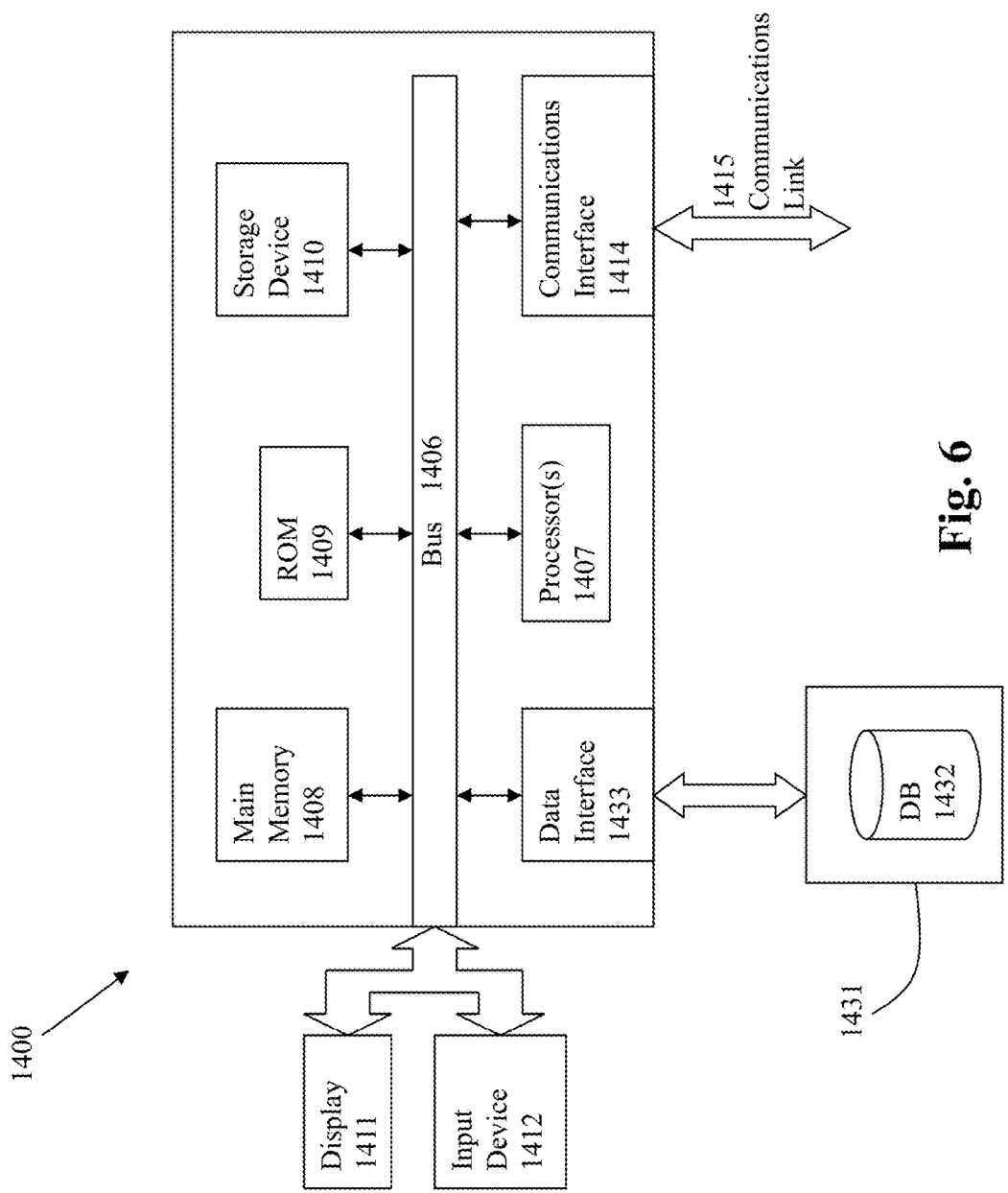
FIG. 6 shows an architecture of an example computing system with which the invention may be implemented.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A data interface 1433 may be used to communicate with a database 1432 on medium 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer-implemented method for implementing transformations for verifying a circuit design, comprising:
analyzing a circuit design comprising a plurality of components;
accessing power intent information for the circuit design;
receiving observable points for the circuit design and accessing one or more verification tasks corresponding to the observable points;
identifying one or more phases for a power sequence associated with the circuit design;
for a phase from the one or more phases, identifying a subset of components from the plurality of components within the circuit design for transformation in a logical representation of the circuit design, wherein a component is identified for the transformation if corruption for the component is observable for the observable points;
executing, at a transformation module stored partially in memory and functioning in conjunction with at least one microprocessor of a computing system, the transformation on the component identified for the transformation to generate a transformed component in the logical representation of the circuit design while skipping execution of the transformation on one or more remaining components in the circuit design; and
performing the verification with the logical representation of the circuit design having the transformed component and the one or more remaining components.

2. The method of claim 1, wherein the verification comprises formal verification.

3. The method of claim 2, in which the power sequence associated with the circuit design is partitioned into the one or more phases.

4. The method of claim 2, in which the observable points are identified from the one or more phases, the observable points pertaining to a specific verification task to be executed from among the one or more verification tasks.

5. The method of claim 2, in which phases are identified by a process comprising:
selecting a property to analyze;
identifying the one or more phases based at least in part upon the one or more conditions; and
extracting one or more conditions for the property.

6. The method of claim 2, wherein behavior of an output of a powered-off domain is reviewed to identify the component to transform.

7. The method of claim 2, wherein the transformation is performed by a process comprising:
determining a power control signal;
determining a supply net;
identifying a dependency between the power control signal and the supply net; and
from the dependency, determining the component to transform.

8. A computer program product that includes a non-transitory computer readable medium, the computer readable medium comprising a plurality of computer instructions which, when executed by a processor, cause the processor to execute performing a process for implementing transformations for verifying a circuit design, the process comprising:
analyzing a circuit design comprising a plurality of components;
accessing power intent information for the circuit design;
receiving observable points for the circuit design and accessing one or more verification tasks corresponding to the observable points;
identifying one or more phases for a power sequence associated with the circuit design;
for a phase from the one or more phases, identifying a subset of components from the plurality of components within the circuit design for transformation in a logical representation of the circuit design, wherein a component is identified for the transformation if corruption for the component is observable for the observable points;
executing, at a transformation module stored partially in memory and functioning in conjunction with at least one microprocessor of a computing system, the transformation on the component identified for the transformation to generate a transformed component in the logical representation of the circuit design while skipping execution of the transformation on one or more remaining components in the circuit design; and
performing the verification with the logical representation of the circuit design having the transformed component and the one or more remaining components.

9. The computer program product of claim 8, wherein the verification comprises formal verification.

10. The computer program product of claim 9, in which the power sequence associated with the circuit design is partitioned into the one or more phases.

11. The computer program product of claim 9, in which the observable points are identified from the one or more phases, the observable points pertaining to a specific verification task to be executed from among the one or more verification tasks.

12. The computer program product of claim 9, wherein the plurality of computer instructions, when executed by a processor, further cause the processor to execute:
selecting a property to analyze;
identifying the one or more phases based at least in part upon the one or more conditions; and
extracting one or more conditions for the property.

13. The computer program product of claim 9, wherein behavior of an output of a powered-off domain is reviewed to identify the component to transform.

14. The computer program product of claim 9, wherein the plurality of computer instructions, when executed by a processor, further cause the processor to execute:
determining a power control signal;
determining a supply net;
identifying a dependency between the power control signal and the supply net; and
from the dependency, determining the component to transform.

15. A system for verifying a design, comprising:
one or more processors that process computer program code, where the one or more processors process the computer code for analyzing a circuit design comprising a plurality of components; accessing power intent information for the circuit design; receiving observable points for the circuit design and identifying one or more verification tasks corresponding to the observable points; identifying one or more phases for a power sequence associated with the circuit design; for a phase from the one or more phases, identifying a subset of components from the plurality of components within the circuit design for transformation in a logical representation of the circuit design, wherein a component is identified for the transformation if corruption for the component is observable for the observable points; executing the transformation on the component identified for the transformation to generate a transformed component in the logical representation of the circuit design while skipping execution of the transformation on one or more remaining components in the circuit design; and performing the verification with the logical representation of the circuit design having the transformed component and the one or more remaining components; and
a tangible, non-transitory storage medium for storing results of verifying the electronic design.

16. The system of claim 15, wherein the verification comprises formal verification.

17. The system of claim 16, in which the power sequence associated with the circuit design is partitioned into the one or more phases.

18. The system of claim 16, in which the observable points are identified from the one or more phases, the observable points pertaining to a specific verification task to be executed from among the one or more verification tasks.

19. The system of claim 16, wherein the computer code, when executed by the one or more processors, further cause the one or more processors to execute:
selecting a property to analyze;
identifying the one or more phases based at least in part upon the one or more conditions; and
extracting one or more conditions for the property.

20. The system of claim 16, wherein behavior of an output of a powered-off domain is reviewed to identify the component to transform.

21. The system of claim 16, wherein the computer code, when executed by the one or more processors, further cause the one or more processors to execute:
determining a power control signal;
determining a supply net;
identifying a dependency between the power control signal and the supply net; and
from the dependency, determining the component to transform.

* * * * *